United States Patent [19]

Roerig et al.

[11] Patent Number: 5,061,087
[45] Date of Patent: Oct. 29, 1991

[54] BEARING APPARATUS FOR A DOCTOR JOURNAL

[75] Inventors: Arnold J. Roerig, Beloit, Wis.; John F. Schmaeng, Rockton, Ill.; Frank J. Wywialowski, Beloit, Wis.

[73] Assignee: Beloit Corporation, Beloit, Wis.

[21] Appl. No.: 597,239

[22] Filed: Oct. 15, 1990

[51] Int. Cl.⁵ .................... F16C 23/04; F16C 13/06
[52] U.S. Cl. .................. 384/192; 384/202; 384/206; 384/419
[58] Field of Search ............. 384/192, 215, 220, 202, 384/203, 206, 300, 301, 418, 419, 495, 498, 558

[56] References Cited

U.S. PATENT DOCUMENTS

| | | | |
|---|---|---|---|
| 3,033,623 | 5/1962 | Thomson | 384/300 X |
| 3,871,223 | 3/1975 | Kralowetz et al. | 384/202 X |
| 4,594,009 | 6/1986 | Gutrig | 384/215 X |
| 4,718,780 | 1/1988 | Trudeau | 384/202 X |

*Primary Examiner*—Thomas R. Hannon
*Attorney, Agent, or Firm*—Dirk J. Veneman; Raymond W. Campbell; David J. Archer

[57] ABSTRACT

A bearing apparatus for permitting axial rotational and angular movement of a doctor journal of a papermaking machine, includes a housing which defines a cylindrical bore for the reception therein of the doctor journal. An annular bearing ring defines an inner and an outer surface with the outer surface being cylindrical and having a diameter slightly less than the diameter of the bore such that when the ring is disposed within the bore, axial sliding of the bearing ring within the bore is permitted. A sleeve is disposed within the bearing ring with the sleeve defining an internal channel for supporting the doctor journal. The sleeve also defines an external face which closely conforms to the inner surface of the bearing ring such that angular movement of the sleeve within the bearing ring is permitted while axial movement of the sleeve relative to the bearing ring is inhibited.

20 Claims, 3 Drawing Sheets

BEARING APPARATUS FOR A DOCTOR JOURNAL

BACKGROUND OF THE INVENTION

1. Field of the Invention

The present invention relates to a bearing apparatus for permitting axial, rotational and angular movement of a doctor journal of a papermaking machine. More particularly, the present invention relates to a bearing apparatus which permits axial oscillation of a doctor in a papermaking machine.

2. Information Disclosure Statement

Doctors are used in all sections of a papermaking machine.

A doctor essentially includes a doctor back, a blade holder and an elongate blade which, when disposed in an operative disposition, cooperates with the cylindrical surface of a roll for peeling or doctoring a web therefrom.

Such doctors are used for cleaning a roll surface, removing a sheet during threading, creping a web, spreading or metering a coating onto a web and sealing a breast roll in a forming section.

In the case of a press section, a doctor typically cooperates with the surface of a press roll for doctoring the wet web therefrom.

However, when the web has been guided from the press roll into and through the subsequent drying section, the doctor blade can be moved from the operative to an inoperative disposition thereof away from the surface of the press roll while the blade is disposed substantially parallel to the rotational axis of the press roll.

Similarly, in the case of a dryer section doctor, the doctor cooperates with the heated outer surface of a drying cylinder such that the web can be doctored therefrom. However, during operation of the drying section, when the drying section has been threaded, the doctors can be moved from their respective drying cylinders to an inoperative disposition thereof.

In both press section and drying section applications, the blade of the doctor is urged into an operative disposition relative to the surface from which the web is to be doctored. Therefore, in the event of a contaminant becoming lodged between the doctor blade and the rotating surface being doctored, such contaminant tends to score the surface of the roll.

Accordingly, oscillating doctors have been proposed in which the doctor in the operative disposition thereof moves axially relative to the roll surface. Such axial movement of the doctor, or oscillation thereof, tends to dislodge any contaminant and, therefore, prevents scoring of the roll surface.

Typically, an oscillating doctor will oscillate through a stroke of approximately one-half inch.

Accordingly, it would appear that the provision of a sliding bearing at both ends of a doctor would be all that would be required, such sliding bearings permitting rotation of the doctor blade away from the roll surface to an inoperative disposition while permitting axial oscillation of the doctor during operation thereof.

However, in view of the fact that doctors typically cooperate with rolls having a width in the region of 34 feet, those skilled in the art will appreciate that such rolls have a tendency to bow during use thereof. Although crown compensating rolls are used to compensate for such bowing, there still exists a tendency for a doctor to bow slightly when the doctor blade is pressed against the external surface of a press roll.

Also, in the case of a doctor in a dryer section, such drying cylinders tend to bow and such bowing cannot be compensated for as in the case of press rolls.

Accordingly, not only is it necessary that the bearing apparatus accommodate rotational and axial movement of the doctor, but also, the bearing apparatus must accommodate the relative bowing of the doctor blade during use thereof. Such bowing of the doctor blade effectively means that the rotational axis of a doctor journal becomes angularly disposed relative to the longitudinal axis of the bearing housing.

In the past, a bearing for an oscillating doctor has included a rubber bushing which stretched and compressed to compensate for the aforementioned angular movement of the doctor relative to the longitudinal axis of the housing.

However, such rubber bushings have required frequent replacement, especially in view of the hostile environment in which such bearings are disposed.

In operation of a papermaking machine, it is not unusual for the equipment, including the doctor bearings, to be hosed with a chemical solution in order to remove contaminants from the papermaking machine. Such chemical solutions have an adverse effect on the rubber bushings and corrosion sensitive materials of the prior art bearings, thus tending to cause their early failure.

The present invention provides a bearing apparatus of unique construction which positively accommodates the angular movement of the doctor journal relative to the housing without the need of compressing the bearing material. Also, the present invention enables convenient replacement of the bearing in the unlikely event of the failure of such bearing.

Therefore, it is a primary objective of the present invention to provide a bearing apparatus which overcomes the aforementioned inadequacies of the prior art bearings for doctor journals, and which provides a significant contribution to the art of doctoring a web.

Another object of the present invention is the provision of a bearing apparatus which permits angular movement of a sleeve within a bearing ring but which inhibits axial movement of the sleeve relative to the bearing ring.

Another objective of the present invention is the provision of a bearing apparatus having a bearing ring which defines a split such that expansion of the diameter of the ring is permitted while the ring is slipped over an external face of a sleeve prior to sliding the combination of the sleeve and the ring axially within a cylindrical bore of a housing.

Another object of the present invention is the provision of a bearing apparatus having a bearing ring which defines a split such that the split accommodates any relative thermal expansion between a sleeve, a housing and the bearing ring.

Another object of the present invention is the provision of a bearing apparatus having a bearing ring which contains TEFLON. TEFLON is a registered trademark of E. I. DuPont De Nemours & Company of Wilmington, Del.

Another object of the present invention is the provision of a bearing apparatus which permits the doctor journal, together with the sleeve and ring, to oscillate axially relative to a housing.

Another object of the present invention is the provision of a bearing apparatus in which the sleeve defines an external face having a spherical surface with a center of curvature on the longitudinal axis of a cylindrical bore defined by a housing such that rotation of the sleeve in any direction within a bearing ring is permitted while the inner surface of the bearing ring captivates the sleeve when the bearing ring is disposed within the cylindrical bore.

Another object of the present invention is the provision of a bearing apparatus in which the external face of a sleeve has a surface roughness which is greater than the surface roughness of a cylindrical bore of the housing such that the sleeve and ring in combination oscillate axially within the cylindrical bore while relative axial movement between the external face and the inner surface of the ring is inhibited.

Another object of the present invention is the provision of a bearing apparatus having a bearing ring which captivates a doctor journal sleeve such that the need for any bearing seal or the like is avoided.

Other objects and advantages of the present invention will be readily apparent to those skilled in the art by a consideration of the detailed description contained hereinafter taken in conjunction with the annexed drawings.

SUMMARY OF THE INVENTION

The present invention relates to a bearing apparatus for permitting axial, rotational and angular movement of a doctor journal of a papermaking machine. The apparatus includes a housing which defines a cylindrical bore for the reception therein of the doctor journal. An annular bearing ring defines an inner and an outer surface. The outer surface is cylindrical and has a diameter slightly less than the diameter of the bore such that when the ring is disposed within the bore, axial sliding of the bearing ring within the bore is permitted. A sleeve is disposed within the bearing ring with the sleeve defining an internal channel for supporting the doctor journal. The sleeve also includes an external face which closely conforms to the inner surface of the bearing ring such that angular movement of the sleeve within the bearing ring is permitted while axial movement of the sleeve relative to the bearing ring is inhibited.

In a more specific embodiment of the present invention, the housing is of stainless steel.

The bearing ring defines a split such that expansion of the diameter of the ring is permitted while the ring is slipped over the external face of the sleeve prior to sliding the combination of the sleeve and the ring axially within the cylindrical bore of the housing.

More specifically, the split is disposed angularly relative to the longitudinal axis of the cylindrical bore when the bearing ring is disposed within the cylindrical bore. Additionally, the split is disposed radially inwardly relative to the cylindrical bore.

In a further embodiment of the present invention, the split is disposed radially inwardly relative to the cylindrical bore, the split being a V-shaped gap such that the split is disposed angularly relative to the longitudinal axis of the cylindrical bore along a part of the axial width of the ring. The arrangement is such that the split is disposed in the opposite angular direction along the remaining part of the axial width of the ring.

The bearing ring contains TEFLON and, more specifically, the bearing ring is a TEFLON and bronze composite. In one embodiment of the present invention, the ring is fabricated from TURCITE 46. TURCITE is a registered trademark of W. S. Shamban & Company of Santa Monica, Calif.

In an alternative embodiment of the present invention, the bearing ring is a TEFLON and carbon composite. A more specific embodiment is of TURCITE 109 which includes carbon.

In a preferred embodiment of the present invention, the sleeve is metallic and, more specifically, is fabricated from stainless steel.

The sleeve in a preferred embodiment of the present invention defines an internal channel which is cylindrical for cooperation with the doctor journal such that the journal, together with the sleeve and the ring, is permitted to oscillate axially relative to the housing.

More specifically, the external face of the sleeve is a portion of a spherical surface with the spherical surface having a center of curvature on the longitudinal axis of the cylindrical bore when the sleeve is disposed within the housing. The arrangement is such that the sleeve is permitted to rotate in any direction within the bearing ring while the inner surface of the bearing ring captivates the sleeve when the bearing ring is disposed within the cylindrical bore.

In a preferred embodiment of the present invention, the external surface of the sleeve has a surface roughness which is greater than the surface roughness of the cylindrical bore such that in use of the bearing apparatus, the sleeve and ring, in combination, oscillate axially within the cylindrical bore while relative axial movement between the external face and the inner surface of the ring is inhibited. More specifically, the external surface of the sleeve has surface roughness which is from 6 to 10 times as rough as the surface roughness of the cylindrical bore.

Many modifications and variations of the present invention will be readily apparent to those skilled in the art by a consideration of the detailed description contained hereinafter taken in conjunction with the annexed drawings. However, such modifications and variations fall within the spirit and scope of the present invention as defined by the appended claims.

It is to be understood by those skilled in the art that doctors can be disposed in the forming section, the calender and the breaker stack section, and in the coater and the sizing press, and in other locations.

The present invention avoids the need of a lubricated bearing, and no seals are required as in some of the prior art bearings. In some prior art bearings, seals were provided on both sides of the bearing to prevent contaminants from damaging the bearing. However, due to the oscillation of such prior art bearings, there existed a tendency for the pumping effect of such seals to suck in moisture and contaminants into the bearing structure.

The split defined by the bearing ring not only facilitates fitting of the bearing apparatus, but also prevents binding of the bearing ring within the housing due to differential thermal expansion.

BRIEF DESCRIPTION OF THE DRAWINGS

Similar reference characters refer to similar parts throughout the various views of the drawings.

DETAILED DESCRIPTION OF THE DRAWINGS

Figure 1:
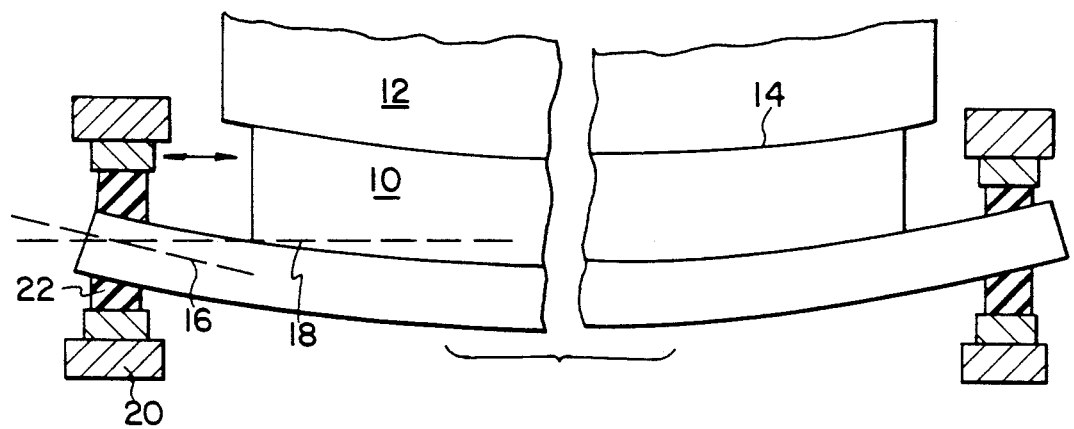
FIG. 1 is a front end view, partially in section, of a typical prior art oscillating doctor with the bowing thereof exaggerated.

FIG. 1 is a front end view, partially in section, of a typical prior art doctor having a blade 10 disposed in operative disposition relative to a roll or cylinder 12. FIG. 1 shows an exaggerated amount of bowing 14 of the cylinder 12 to emphasize how the rotational axis 16 of each of the doctor journals is angularly disposed relative to the longitudinal axis 18 of the bearing housing 20. Such angularity between the axes 16 and 18 is accommodated for by rubber bush means 22. Other prior art doctors use ball bearings or cam follower bearings and the like, all of which are subject to corrosion and failure.

Figure 2:
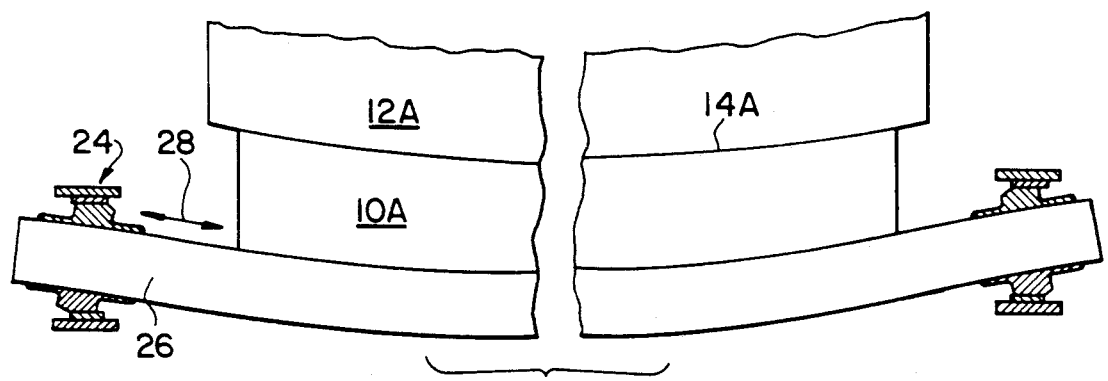
FIG. 2 is a similar view to that shown in FIG. 1 but shows a doctor and bearing apparatus according to the present invention.

FIG. 2 is a front end view, partially in section, of a bearing apparatus, according to the present invention. The bearing apparatus, generally designated 24, permits axial, rotational and angular movement of a doctor journal 26 of a papermaking machine.

Figure 3:
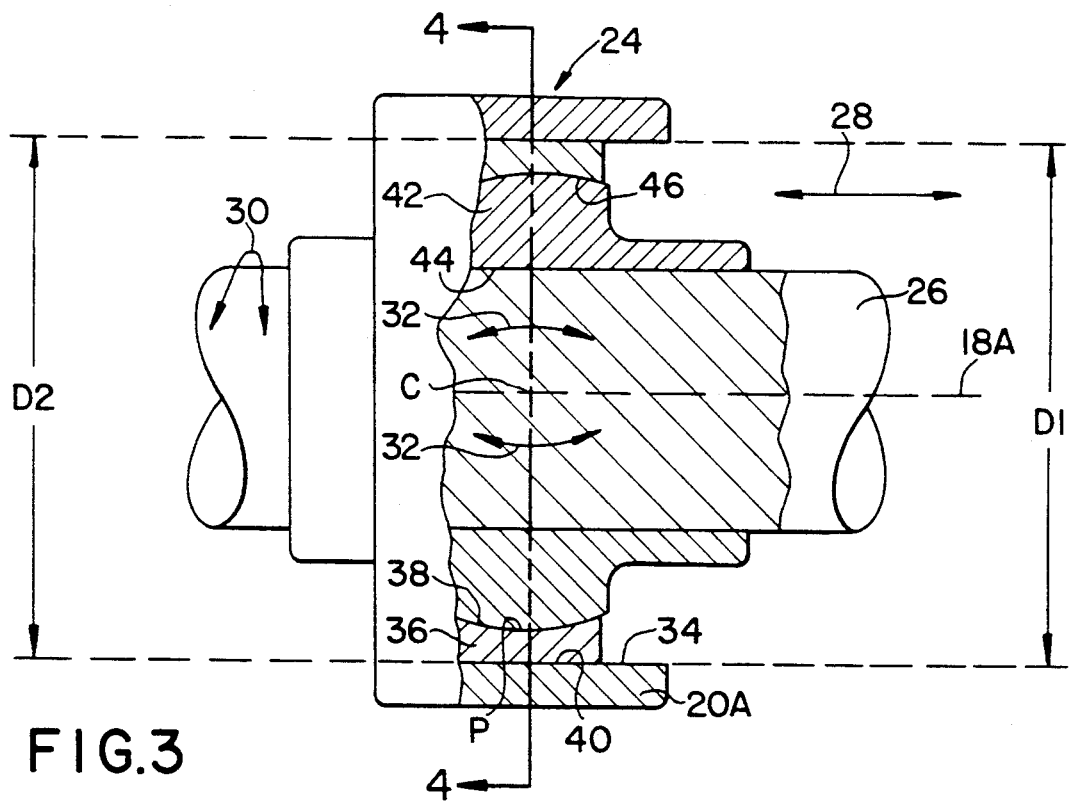
FIG. 3 is an enlarged sectional view of the bearing apparatus shown in FIG. 2 but showing the sleeve and housing in alignment.

FIG. 3 is an enlarged sectional view of the bearing apparatus shown in FIG. 2 but showing the journal aligned with a bearing housing. The bearing apparatus 24 permits axial movement as indicated by the arrow 28, rotational movement as indicated by the arrow 30, and angular movement as indicated by the arrows 32 so that the doctor journal 26 is permitted to move axially, rotationally and angularly within a housing 20A.

The housing 20A defines a cylindrical bore 34 for the reception therein of the doctor journal 26. An annular bearing ring 36 defines an inner and an outer surface 38 and 40 respectively. The outer surface 40 is cylindrical and has a diameter D1 which is slightly less than the diameter D2 of the bore 34 such that when the ring 36 is disposed within the bore 34, axial sliding of the bearing ring 36 within the bore 34, as indicated by the arrow 28, is permitted.

A sleeve 42 is disposed within the bearing ring 36. The sleeve 42 defines an internal channel 44 for supporting the doctor journal 26. The sleeve 42 also includes an external face 46 with the external face 46 closely conforming to the inner surface 38 of the bearing ring 36 such that angular movement of the sleeve 42 within the bearing ring 36 is permitted, as indicated by the arrows 32, while axial movement of the sleeve 42 within the bearing ring 36, as indicated by the arrow 28, is inhibited.

Figure 4:
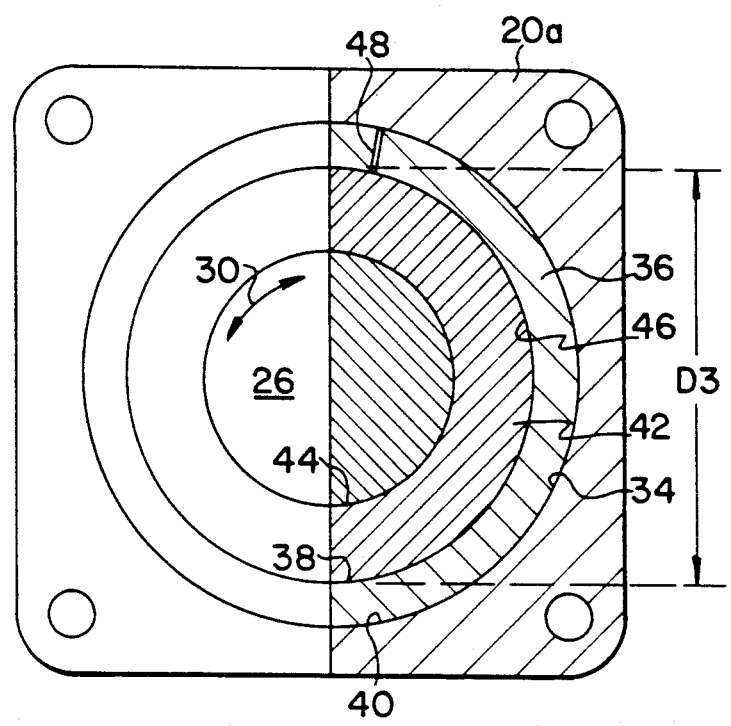
FIG. 4 is a sectional view taken on the line 4—4 shown in FIG. 3.

FIG. 4 is a sectional view taken on the line 4—4 of FIG. 3. More specifically, the housing 20A is of stainless steel, and the bearing ring 36 defines a split 48 such that expansion of the diameter D3 of the ring 36 is permitted while the ring 36 is slipped over the external face 46 of the sleeve 42 prior to sliding the combination of the sleeve 42 and the ring 36 axially within the cylindrical bore 34 of the housing 20A. The split 48 also prevents binding of the ring 36 in the bore 34 when differential thermal expansion between the housing 20A and the sleeve 42 and ring 36 occurs.

Figure 5:
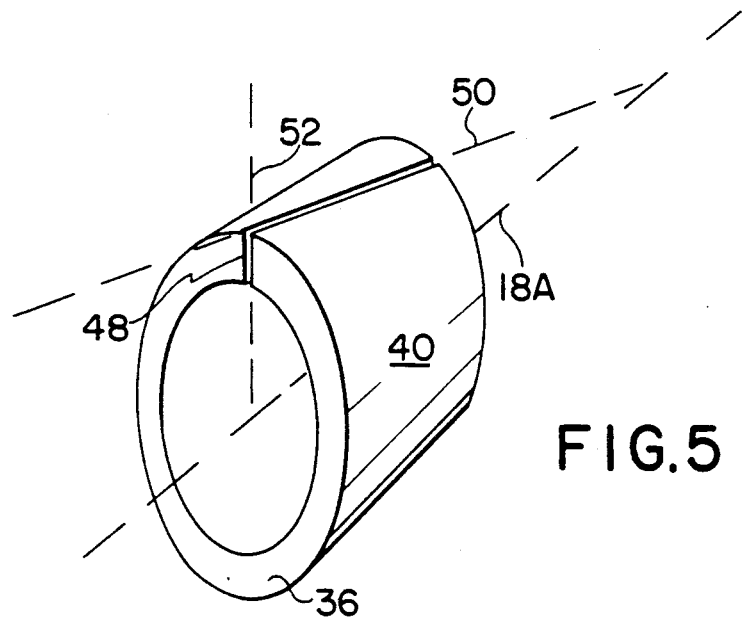
FIG. 5 is a perspective view of a bearing ring showing a split therein according to one embodiment of the present invention.

FIG. 5 is a perspective view of the bearing ring 36. As shown in FIG. 5, the split 48 is disposed angularly, as indicated by the line 50, relative to the longitudinal axis 18A of the cylindrical bore 34 when the bearing ring 36 is disposed within the cylindrical bore 34.

The split 48 is also disposed radially relative to the cylindrical bore 34, as indicated by the line 52 shown in FIG. 5.

Figure 6:
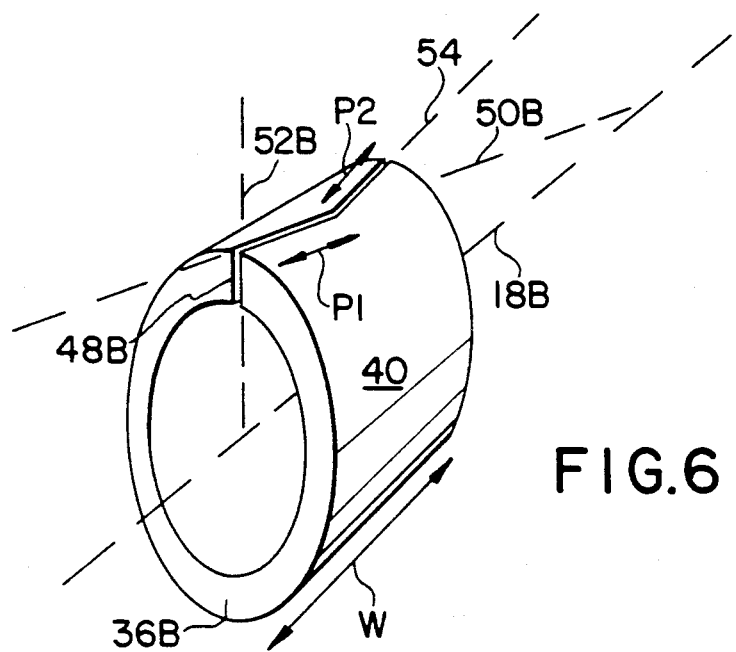
FIG. 6 is a similar view to that shown in FIG. 5 but shows an alternative embodiment in which the split is V-shaped.

FIG. 6 is a similar view to that shown in FIG. 5 but shows an alternative embodiment of the present invention in which a split 48B is disposed radially inwardly relative to the cylindrical bore 34, as indicated by the line 52B. The split 48B is a V-shaped gap such that the split 48B is disposed angularly, as indicated by the line 50B, relative to the longitudinal axis 18B of the cylindrical bore 34 along a part P1 of the axial width W of the ring 36B. The split 48B is disposed in the opposite angular direction, as indicated by the line 54, along the remaining part P2 of the axial width W of the ring 36.

The bearing ring 36,36B contains TEFLON and, more particularly, is a composite including TEFLON and bronze. In a specific embodiment, the ring is of TURCITE 46, which includes TEFLON and bronze.

In a preferred embodiment of the present invention, the ring 36 is a composite of TEFLON and carbon. A specific embodiment includes a ring of TURCITE 109 which includes carbon and TEFLON. TURCITE 109 has proved to be better when used in conjunction with stainless steel as the TEFLON therein tends to migrate onto the stainless steel. The carbon used in TURCITE 109 is not graphite and is found to work better than dry graphite.

As shown in FIGS. 2-5, the sleeve 42 is metallic and, more particularly, is fabricated from stainless steel.

The internal channel 44 of the sleeve 42 is cylindrical for cooperation with the doctor journal 26 such that the journal 26, together with the sleeve 42 and the ring 36, are permitted to oscillate axially relative to the housing 20A, as shown by the arrow 28.

The external face 38 of the sleeve 42 is a portion P of a spherical surface as shown in FIG. 3.

More specifically, the portion P of the spherical surface has a center of curvature C on the longitudinal axis 18A of the cylindrical bore 34 such that the sleeve 42 is permitted to rotate, as shown by the arrow 30, and to move in any direction, as indicated by the arrows 32, within the bearing ring 36 while the inner surface 38 of the bearing ring 36 captivates the sleeve 42 when the bearing ring 36 is disposed within the cylindrical bore 34.

The external face 46 of the sleeve 42 has a surface roughness which is greater than the surface roughness of the cylindrical bore 34 such that in use of the bearing apparatus 24, the sleeve 42 and the ring 36, in combination, oscillate axially within the cylindrical bore 34, as shown by the arrow 28, while relative axial movement between the external face 46 and the inner surface 38 of the ring 36 is inhibited.

More specifically, the roughness of the external face 46 is from 6 to 10 times the surface roughness of the bore 34.

In operation of the bearing apparatus 24 according to the present invention, the sleeve 42 is moved into position axially over the bearing journal 26, and the bearing ring 36 is slipped over the spherical surface 46 of the sleeve 42. The housing 20A is then moved axially relative to the ring 36 such that the ring and sleeve are received within the bore 34 of the housing, which is anchored to a frame (not shown).

In the unlikely event of the bearing apparatus failing, the replacement of the bearing ring 36 is very simple. The housing 20A is unbolted from the frame and is moved axially relative to the ring 36. The ring 36 is removed from the sleeve 42 by expanding the ring 36 by opening the gap provided by the split 48. The ring 36 is replaced by a new ring, and the housing is moved back axially so that the outer surface 40 of the bearing ring 36 slides within the bore 34.

Alternatively, the sleeve is moved relative to the housing so that the ring can be replaced.

Usually, various equipment is attached to the outer end of a doctor bearing journal in order to oscillate the doctor journal axially relative to the bearing housing and frame. With the present invention, it is not necessary to remove such associated equipment because when a bearing ring is to be replaced, all that is necessary is to unbolt the bearing housing or move the sleeve axially relative to the housing in order to replace the bearing ring. More particularly, it is not necessary to slip a new bearing ring and housing over the end of the bearing journal as is the case with the prior art type of journal bearings which include rubber bushings or ball bearings or the like.

Therefore, the present invention provides a reliable, virtually trouble free, bearing arrangement for an oscillating doctor. The present invention also provides a simple means for repairing or replacing such bearing in the event of any failure thereof.

What is claimed is:

1. A bearing apparatus for permitting axial, rotational and angular movement of a doctor journal of a papermaking machine, said apparatus comprising:
   a housing defining a cylindrical bore for the reception therein of the doctor journal;
   an annular bearing ring defining an inner and an outer surface, said outer surface being cylindrical and having a diameter slightly less than the diameter of said bore such that when said ring is disposed within said bore, axial sliding of said bearing ring within said bore is permitted; and
   a sleeve disposed within said bearing ring, said sleeve defining an internal channel for supporting the doctor journal and an external face, said external face closely conforming to said inner surface of said bearing ring such that angular movement of said sleeve within said bearing ring is permitted while axial movement of said sleeve relative to said bearing ring is inhibited.

2. A bearing apparatus as set forth in claim 1 wherein said housing is of stainless steel.

3. A bearing apparatus as set forth in claim 1 wherein said bearing ring defines a split such that expansion of the diameter of said ring is permitted while said ring is slipped over said external face of said sleeve prior to sliding the combination of said sleeve and said ring axially within said cylindrical bore of said housing.

4. A bearing apparatus as set forth in claim 3 wherein said split is disposed angularly relative to the longitudinal axis of said cylindrical bore when said bearing ring is disposed within said cylindrical bore such that replacement of said ring is facilitated and binding of said ring within said bore due to differential thermal expansion is inhibited.

5. A bearing apparatus as set forth in claim 4 wherein said split is disposed radially inwardly relative to said cylindrical bore.

6. A bearing apparatus as set forth in claim 3 wherein said split is disposed radially inwardly relative to said cylindrical bore, said split being a V-shaped gap such that said split is disposed angularly relative to the longitudinal axis of said cylindrical bore along part of the axial width of said ring, said split being disposed in the opposite angular direction along the remaining part of the axial width of said ring.

7. A bearing apparatus as set forth in claim 1 wherein said bearing ring contains TEFLON.

8. A bearing apparatus as set forth in claim 7 wherein said bearing ring is a composite including TEFLON and bronze.

9. A bearing apparatus as set forth in claim 7 wherein said bearing ring is of TURCITE 46.

10. A bearing apparatus as set forth in claim 7 wherein said bearing ring is a composite including TEFLON and carbon.

11. A bearing apparatus as set forth in claim 7 wherein said bearing ring is of TURCITE 109.

12. A bearing apparatus as set forth in claim 1 wherein said sleeve is metallic.

13. A bearing apparatus as set forth in claim 12 wherein said sleeve is of stainless steel.

14. A bearing apparatus as set forth in claim 1 wherein said internal channel is cylindrical for cooperation with the doctor journal such that the journal, together with said sleeve and said ring, is permitted to oscillate axially relative to said housing.

15. A bearing apparatus as set forth in claim 1 wherein said external face is a portion of a spherical surface.

16. A bearing apparatus as set forth in claim 15 wherein said portion of said spherical surface has a center of curvature on the longitudinal axis of said cylindrical bore such that said sleeve is permitted to rotate in any direction within said bearing ring while said inner surface of said bearing ring captivates said sleeve when said bearing ring is disposed within said cylindrical bore.

17. A bearing apparatus as set forth in claim 15 wherein said external face of said sleeve has a surface roughness which is greater than the surface roughness of said cylindrical bore such that in use of said bearing apparatus, said sleeve and ring, in combination, oscillate axially within said cylindrical bore while relative axial movement between said external face and said inner surface of said ring is inhibited.

18. A bearing apparatus as set forth in claim 17 wherein said surface roughness of said external face is from 6 to 10 times rougher than said surface roughness of said cylindrical bore.

19. A bearing apparatus for permitting axial, rotational and angular movement of a doctor journal of a papermaking machine, said apparatus comprising:
   a housing defining a cylindrical bore for the reception therein of the doctor journal;
   an annular bearing ring defining an inner and an outer surface, said outer surface being cylindrical and having a diameter slightly less than the diameter of said bore such that when said ring is disposed within said bore, axial sliding of said bearing ring within said bore is permitted;
   a sleeve disposed within said bearing ring, said sleeve defining an internal channel for supporting the doctor journal and an external face, said external face closely conforming to said inner surface of said bearing such that angular movement of said sleeve within said bearing ring is permitted while axial movement of said sleeve relative to said bearing ring is inhibited; and said bearing ring defining a split such that expansion of the diameter of said ring is permitted while said ring is slipped over said external face of said sleeve prior to sliding the combination of said sleeve and said ring axially within said cylindrical bore of said housing, said split also inhibiting binding of said ring within said bore due to differential thermal expansion between said housing, said bearing ring, and said sleeve.

20. A bearing apparatus for permitting axial, rotational and angular movement of a doctor journal of a papermaking machine, said apparatus comprising:

a housing defining a cylindrical bore for the reception therein of the doctor journal;

an annular bearing ring defining an inner and an outer surface, said outer surface being cylindrical and having a diameter slightly less than the diameter of said bore such that when said ring is disposed within said bore, axial sliding of said bearing ring within said bore is permitted;

a sleeve disposed within said bearing ring, said sleeve defining an internal channel for supporting the doctor journal and an external face, said external face closely conforming to said inner surface of said bearing ring such that angular movement of said sleeve within said bearing ring is permitted while axial movement of said sleeve relative to said bearing ring is inhibited;

said external face being a portion of a spherical surface such that said bearing ring captivates said sleeve when said bearing ring is disposed within said cylindrical bore; and said bearing ring being a composite which includes TEFLON such that axial, rotational and angular movement of the doctor journal within said housing is permitted while the need for seals is avoided.

* * * * *